United States Patent [19]

Rabatin

[11] Patent Number: 4,540,599

[45] Date of Patent: Sep. 10, 1985

[54] X-RAY IMAGE CONVERTER DEVICES UTILIZING RARE EARTH OXYHALIDE PHOSPHORS

[75] Inventor: Jacob G. Rabatin, Montville, Ohio

[73] Assignee: General Electric Company, Schenectady, N.Y.

[21] Appl. No.: 658,713

[22] Filed: Oct. 9, 1984

Related U.S. Application Data

[62] Division of Ser. No. 483,342, Apr. 8, 1983, Pat. No. 4,498,008.

[51] Int. Cl.³ .............................................. G01J 1/58
[52] U.S. Cl. ...................................... 427/65; 427/73; 427/157; 427/160
[58] Field of Search ..................... 427/65, 73, 157, 160

[56] References Cited

U.S. PATENT DOCUMENTS

Re. 28,592 10/1975 Rabatin et al. ............... 252/301.4 H
3,591,516 7/1971 Rabatin .......................... 252/301.4 R
4,315,979 2/1982 Brines et al. ............................ 430/6

FOREIGN PATENT DOCUMENTS 2461260 7/1976 Fed. Rep. of Germany .

Primary Examiner—James R. Hoffman
Attorney, Agent, or Firm—J. F. McDevitt; Philip L. Schlamp; Fred Jacob

[57] ABSTRACT

An improved X-ray image converter is disclosed which utilizes a phosphor layer of plate-like rare earth oxyhalide phosphor crystals having said phosphor crystals physically aligned to improve light emission from the phosphor layer. More particularly, said phosphor layer is formed with the plate-like crystals being aligned generally parallel to the longitudinal axis of said phosphor layer at both surface regions while the intermediate phosphor crystals are aligned generally perpendicular to said longitudinal axis. Said improvement can be provided during formation of phosphor layer from a liquid suspension by introducing particular velocity gradients in the flow pattern of said liquid suspension.

7 Claims, 6 Drawing Figures

X-RAY IMAGE CONVERTER DEVICES UTILIZING RARE EARTH OXYHALIDE PHOSPHORS

This is a division of application Ser. No. 483,342, filed Apr. 8, 1983, now U.S. Pat. No. 4,498,008.

CROSS REFERENCE TO RELATED APPLICATIONS

In my pending application Ser. No. 483,335, filed Apr. 8, 1983, and now abandoned which is assigned to the assignee of the present invention, there is disclosed modified rare earth oxyhalide phosphors activated with terbium and/or thulium ion exhibiting improved optical resolution for the light image produced therefrom in x-ray image converter devices by reason of the particle size and shape of the phosphor crystals. A preparation method is also therein disclosed where the selected oxyhalide phosphor is recrystallized as a means to produce phosphor crystals having a more polyhedral shape. In still another copending application Ser. No. 483,343, filed Apr. 8, 1983, which is also assigned to the present assignee and filed in my name, there is disclosed novel reflector means for x-ray image converter devices utilizing rare earth oxyhalide phosphors activated with terbium and/or thulium to still further improve the brightness of the light image produced by said phosphor medium. Said improved reflector means utilizes smaller particle size crystals of an inorganic crystalline solid exhibiting high reflectance in the 300–400 nanometers spectral region to reflect incident UV radiation back through the phosphor layer of an x-ray image converter device for impingement upon the recording or readout means in said device. The present improvement can utilize either or both of said prior improvements to realize still further sharpness and speed of the light image being produced along with still other performance advantages.

BACKGROUND OF THE INVENTION

The phosphor layers used in x-ray image converter devices are generally deposited from a liquid suspension at carefully controlled thicknesses to govern the quality of the light images produced therefrom. A conventional method to deposit such phosphor layers in an x-ray screen construction employs a doctor blade producing a physical alignment of the plate-like rare earth oxyhalide phosphor particles generally parallel to the longitudinal axis of said phosphor layer. Typical 8 micron average median diameter size lanthanum oxybromide particles (APD), as measured by conventional Coulter Counter instrument, have dimensions of about $3 \times 12 \times 12$ microns. In the normal doctor blade operation, the aforementioned flat and parallel alignment of these phosphor particles is attributable to a velocity gradient produced by said doctor blade during streamline flow of the liquid phosphor suspension while being deposited. Since the phosphor particle thickness in the direction of an associated photographic film is thereupon only about 3 microns, any light photon generated in said phosphor layer can have as many as 50 scattering events before reaching the associated photographic film in a typical 150 micron thick phosphor layer screen device. Such light scattering produces loss of sharpness in the recorded light image which is understandably not desirable. Moreover, because the phosphor particle size in said phosphor layer, is about 12 microns in the opposite direction along the longitudinal axis of said phosphor layer, there occurs a spreading of the light image resulting in still further loss of clarity for the recorded image. Reduction of these problems in x-ray image converter devices utilizing these phosphor materials would not only improve image sharpness and speed but further reduce quantum noise in the recorded image by increased utilization of emitted light from the phosphor layer.

It would be desirable, therefore, to improve the physical alignment of these phosphor particles in the phosphor layer of an x-ray image converter device and to do so in a manner not requiring elaborate modification of the method now being used to produce these phosphor layers. It would be further desirable to provide such improvement in a manner which affords still other performance advantages to said modified phosphor layers.

SUMMARY OF THE INVENTION

An improved x-ray image converter is herein provided which includes a phosphor layer of plate-like phosphor crystals having the structural formula:

$$LnOX:T_x$$

wherein
Ln is one or more of La and Gd,
X is one or more of Cl and Br, and
$T_x$ is an activator ion selected from Tb and Tm, including mixtures thereof, said phosphor layer being formed with the plate-like crystals being aligned generally parallel to the longitudinal axis of said phosphor layer at both surface regions while the intermediate phosphor crystals are aligned generally perpendicular to said longitudinal axis. Such physical orientation for the intermediate phosphor particles in the present phosphor layer not only reduces internal light scattering events but further provides a desirable "light piping" effect improving transmission of both visible and UV emission to the associated recording or readout means of said modified x-ray image converter device. The desired physical orientation of said intermediate phosphor particles is provided when the phosphor is deposited from a liquid suspension on a suitable physical support in the x-ray image converter device by introducing a velocity gradient in the flow pattern of said liquid suspension while being deposited in a direction perpendicular to the longitudinal axis of said deposition direction. Such a modification in forming said phosphor layer utilizes a first velocity gradient in a direction corresponding to the longitudinal axis of said phosphor layer deposition while a second velocity gradient in a direction generally perpendicular to said longitudinal axis is also being applied. The specific steps employed in carrying out the present overall modified preparation method comprise:

(a) forming a liquid suspension containing said phosphor crystals and a binder,
(b) depositing said liquid suspension on a physical support with a first velocity gradient in the flow direction corresponding to the longitudinal axis of said phosphor layer and a second velocity gradient in the flow direction generally perpendicular to said longitudinal axis, and
(c) removing liquid from said deposited liquid suspension to form a solid phosphor layer adhesively bonded to said physical support.

In a preferred embodiment, said modified deposition method produces streamline flow of said liquid suspension on said physical support with a doctor blade having spaced apart openings at the edge contacting said suspension which establishes a first velocity gradient in the flow stream between said blade edge and physical support while the second velocity gradient occurs selectively in the flow stream which enters said blade openings. Employment of a stationary doctor blade produces further nonuniform alignment of the intermediate phosphor crystals in said phosphor layer with such nonuniformity occurring in a horizontal plane transverse to the longitudinal axis of the deposited layer. Since this nonuniformity can produce some distortion of the light image, the doctor blade is desirably vibrated in said transverse direction while the phosphor layer is being deposited. If the linear speed of phosphor deposition on a moving physical support is made approximately equal to the linear speed of doctor blade vibration, then a sinusoidal wave pattern is created in the deposited phosphor layer which effectively cancels any light image distortion caused in this manner.

Preferred rare earth oxyhalide phosphor materials useful in the practice of the present invention comprise lanthanum and gadolinium oxybromide activated with terbium and/or thulium ion, including mixtures thereof. Said terbium activated phosphor utilizes terbium ion at a concentration the range from about 0.0001 to about 0.10 mole per mole of the selected oxybromide material. Correspondingly, the thulium activated phosphor material utilizes thulium ion in the range from about 0.0001 to about 0.10 mole per mole of the selected oxybromide material. Especially preferred phosphor materials still further include plus 3 valence replacement metal ions in the phosphor matrix, as further more particularly disclosed in the aforementioned copending Ser. No. 483,335 application, to obtain improved brightness of the light image attributable to the particle size and more polyhedral shape of said phosphor particles. Accordingly, from a small but effective amount up to approximately 0.2 mole per mole of phosphor of said replacement metal ions is desirably employed to produce an average median particle size of the modified phosphor in the range extending from approximately 3.0 microns diameter up to approximately 9.0 microns diameter along with a more narrow particle size distribution.

In preferred x-ray image converter devices according to the present invention the phosphor layer is positioned adjacent a reflector layer which reflects incident UV radiation back through said phosphor layer, as more particularly described in the remaining aforementioned copending application Ser. No. 483,343. Said reflector means comprises smaller particle size crystals of an inorganic crystalline solid exhibiting high reflectance in the 300–400 nanometer spectral region, said reflector crystals desirably having a particle size between about 0.2 micron up to about 0.8 micron along with exhibiting a refractive index of at least 2.0. Utilization of said improved reflector means in combination with the above identified especially preferred phosphors promotes optimum sharpness of the light image emitted from the phosphor layer by cooperative action of all said improvements. The physical configuration of a preferred multi-layer x-ray screen construction exhibiting optimum improvement thereby comprises:

(a) a photographic film having emulsion layers disposed on each major surface and separated by an optically transparent support, (b) a pair of phosphor layers being positioned one on each side of said photographic film to form a sandwich configuration, said phosphor layers each having plate-like crystals of a phosphor with the structural formula:

$$LnOX:T_x$$

wherein
 Ln is one or more of La and Gd,
 X is one or more of Cl and Br, and
 $T_x$ is an activator ion selected from Tb and Tm, including mixtures thereof,
 said phosphor layers each being formed with the plate-like crystals being aligned generally parallel to the longitudinal axis of said phosphor layers at both surface regions while the intermediate phosphor crystals are aligned generally perpendicular to said longitudinal axis, and (c) a pair of reflector layers positioned one on each side of said phosphor layers furthest removed from said photographic film, said reflector layers comprising smaller particle size crystals of an inorganic crystalline solid exhibiting high reflectance in the 300–400 nanometer spectral region.

Understandably, it would be further desirable to provide the aforementioned sinusoidal wave patterns in both deposited phosphor layers as a means to cancel out any light image distortion caused by nonuniform deposition of the intermediate phosphor particles which might otherwise occur.

DESCRIPTION OF THE PREFERRED EMBODIMENTS

Figure 1:
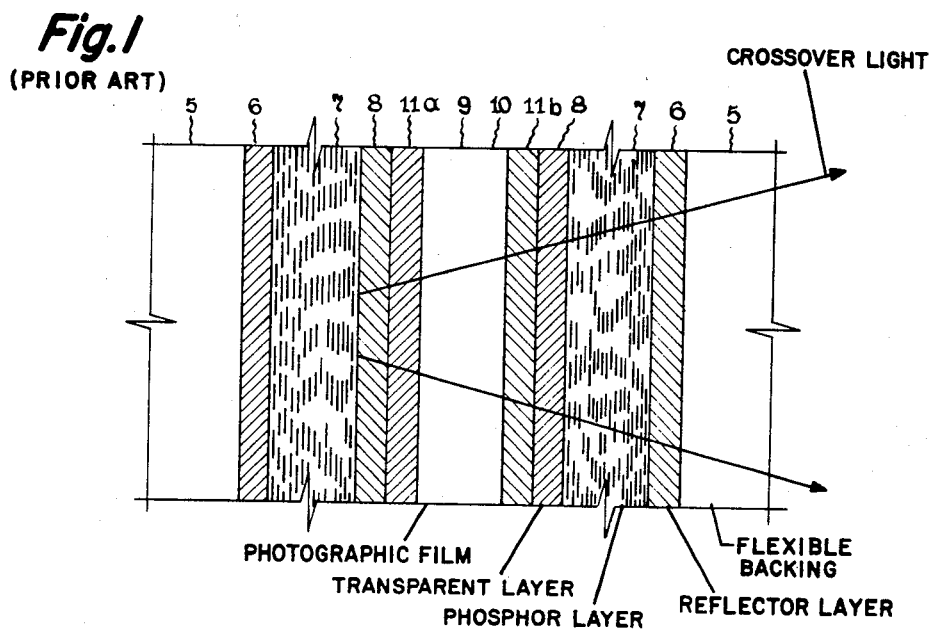
FIG. 1 is a cross-section of a prior art multi-layer x-ray screen illustrating conventional alignment of rare earth oxyhalide phosphor particles in the phosphor layers along with a customary light crossover problem encountered therewith.
Figure 2:
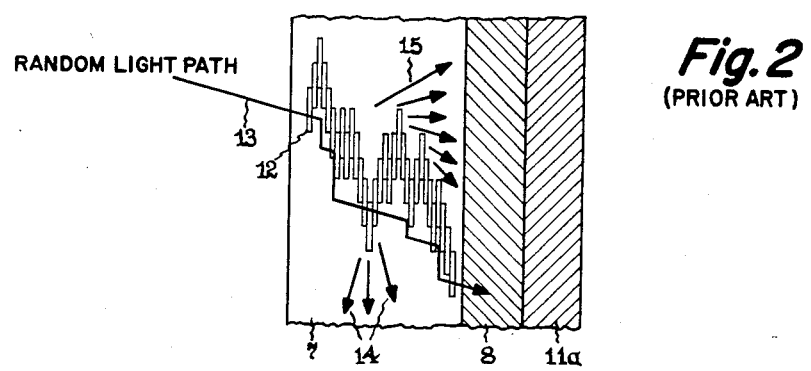
FIG. 2 is a more detailed cross-sectional view depicting a light path through an individual phosphor layer of the FIG. 1 screen embodiment.

Referring to FIGS. 1–2, a prior art multi-layer x-ray screen is depicted in cross-section having a double emulsion photographic film 9 with an optically transparent polyester base 10 preferably incorporating a dye system to absorb the ultraviolet and light emission which ordinarily crosses over from one of the silver halide emulsion layers to the other, 11a to 11b, and vice-versa. Such emission crossover causes widening of images and blurring due to lack of alignment or registry between the images formed on the particular emulsion layer being exposed and the more remote emulsion layer receiving the crossover image. This is illustrated by the crossover rays passing from emulsion layer 11a to 11b in the depicted FIG. 1 embodiment. As will be appreciated, there is an enlarged image on the emulsion layer 11b which will be read as a blurring effect after the film has been developed. Said prior art x-ray screen further includes flexible backing 5 which supports a pair of reflecting layers 6 positioned adjacent the exteriormost major surfaces of a pair of conventional phosphor layers 7. Further transparent layers 8 are utilized in said illustrated x-ray screen to resist mechanical abrasion of the photographic film and/or phosphor layers during physical movement therebetween when exposed film is removed for development and a new film inserted for additional use of said screen. The light transmission produced with conventional plate-like rare earth oxyhalide phosphor crystals in said phosphor layers is illustrated in FIG. 2. Accordingly, said plate-like shaped rare earth oxyhalide phosphor particles 12 are generally stacked in a parallel direction with respect to the longitudinal axis of the associated photographic film. Such physical alignment of the individual phosphor particles leads to light scattering with accompanying loss in sharpness of the light image produced when x-rays excite said phosphor layer 7. A random light path 13 occurs through said phosphor layer with certain light rays 14 not being transmitted to the associated film 11a as desirably takes place with the light rays 15. It can be further noted in said embodiment, that transparent layer 8 provides a suitable physical support upon which to form the phosphor layer.

Figure 3:
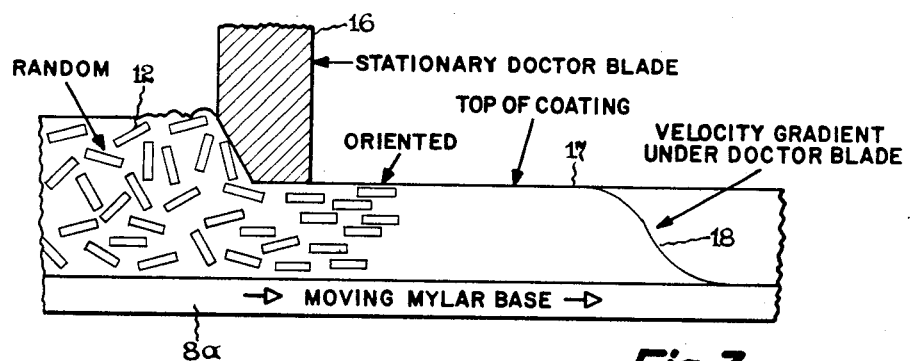
FIG. 3 is a cross-sectional view depicting conventional preparation of the FIGS. 1-2 phosphor layer embodiments.

There is shown in FIG. 3 the operation of a conventional doctor blade coating apparatus customarily employed to form the prior art phosphor layers described in the preceding embodiments. More particularly, means are provided in said apparatus (not shown) to move a suitable physical support on which the liquid phosphor suspension is deposited, such as mylar base 8a, below the edge of a stationary doctor blade 16 during deposition of said liquid phosphor suspension. The resulting thickness 17 for said phosphor layer is controlled in this manner along with producing a physical alignment of the phosphor particles 12 in a direction parallel to the longitudinal axis of said phosphor layer. A velocity gradient 18 caused by streamline flow of the liquid phosphor suspension while being deposited causes said physical alignment after passage of the liquid beneath said doctor blade member.

Figure 4:
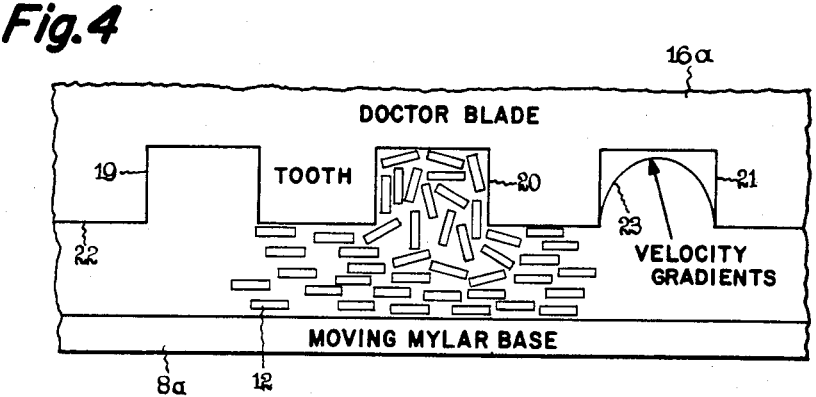
FIG. 4 is a cross-section depicting formation of an improved phosphor layer according to present invention.
Figure 5:
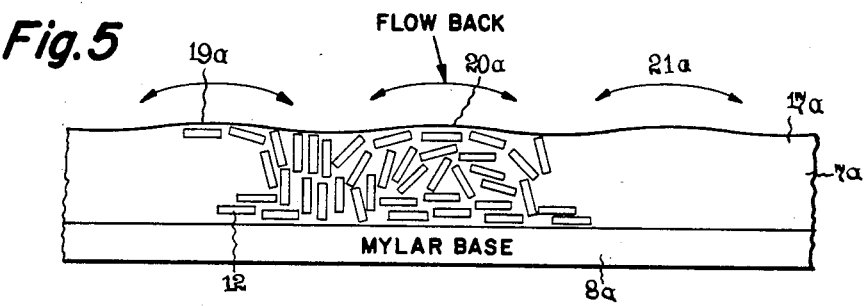
FIG. 5 depicts flow of the liquid phosphor suspension in accordance with the present invention after passage beneath the modified doctor blade embodiment shown in FIG. 4.
Figure 6:
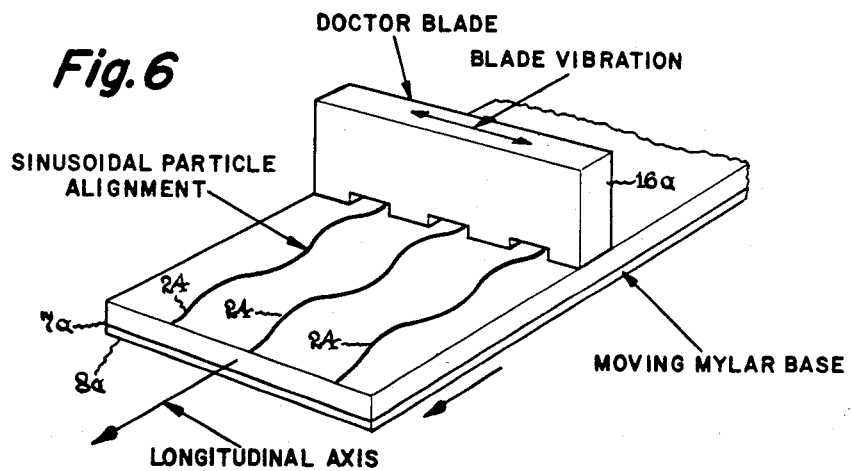
FIG. 6 depicts vibration of said modified doctor blade in accordance with the present invention.

Referring to FIGS. 4–6, there is illustrated a modified doctor blade coating apparatus providing the means to align the phosphor particles in accordance with the present invention. Specifically, a stationary doctor blade member 16a is provided having spaced apart teeth elements 19–21 disposed on the edge 22 contacting the liquid phosphor suspension when being dsposited on moving mylar base 8a. Such movement of the phosphor suspension past said spaced apart openings creates a flow velocity gradient 23 in the openings which physically align part of said phosphor particles 12 in a direction generally perpendicular to the longitudinal axis of the deposited phosphor layer. As can be further noted, the remaining phosphor particles retain a physical orientation parallel to said longitudinal axis in response to the aforementioned flow velocity gradient experienced when said liquid phosphor suspension passes beneath the contacting edge of said doctor blade member not having any openings. The presently modified deposition method thereby subjects the liquid phosphor suspension while being deposited to a first velocity gradient in the direction corresponding to the longitudinal axis of said phosphor layer together with a second velocity gradient occurring in the direction generally perpendicular to said longitudinal axis. There is further shown in FIG. 5 a cross section of said modified phosphor layer 7a after its passage beneath the presently modified doctor blade member and sufficient time has elapsed for flow back or settling of the top surface region 17a which produces the final alignment of phosphor particles in said phosphor layer. Flow back or settling occurs at surface regions 19a, 20a, and 21a which lie in approximate physical registry with the correspondingly numbered opening of the modified doctor blade member and produce parallel alignment of the phosphor particles in said regions with respect to the longitudinal axis of the phosphor layer. Accordingly, a parallel alignment of the phosphor particles in both surface regions of the deposited phosphor layer results with the intermediate phosphor crystals being aligned generally perpendicular to the longitudinal axis when liquid is removed from the deposited phosphor suspension to form a solid coating bonded to its physical support.

In FIG. 6 there is shown a still further improvement in the phosphor layer 7a to remove optical distortion in the light image which can be formed in the FIGS. 4–5 embodiments with a stationary doctor blade. More particularly, it can be noted by inspection of the FIG. 5 horizontal phosphor layer embodiment that some nonuniformity exists in the surface particle alignment from unequal flow between the regions contacted by openings in the doctor blade. Such nonuniformity is reduced in accordance with the presently described embodiment by vibrating said blade member 16a in a direction transverse to the longitudinal axis of the deposited liquid phosphor suspension. This vibration produces a sinusoidal wave pattern of liquid deposition 24 which effectively cancels such nonuniform phosphor particle alignment.

It will be apparent from the foregoing description that improved x-ray image converter devices have been provided utilizing rare earth oxyhalide phosphors along with a novel method for preparing phosphor layers in said devices. It should be appreciated from said foregoing description, however, that still other phosphors of this type other than above specifically disclosed can be employed with comparable results. Additionally, other x-ray image converter devices than specifically disclosed but utilizing the same type phosphor materials can also be modified in accordance with the present teachings. It is intended to limit the present invention, therefore, only by the scope of the foregoing claims.

What I claim is new and desire to secure by Letters Patent of the United States is:

1. A process for the preparation of a layer of rare earth oxyhalide phosphor crystals having a plate-like shape for use in an x-ray image converter device comprising the steps of:

(a) forming a liquid suspension containing said phosphor crystals and a binder, said phosphor crystals having the structural formula:

$LnOX:T_x$ wherein
Ln is one or more of La and Gd,
X is one or more of Cl and Br, and
$T_x$ is an activator ion selected from Tb and Tm, including mixtures thereof, (b) depositing said liquid suspension on a physical support with a first velocity gradient in the flow direction corresponding to the longitudinal axis of said phosphor layer and a second velocity gradient in the flow direction generally perpendicular to said longitudinal axis, and (c) removing liquid from said deposited liquid suspension to form a solid phosphor coating adhesively bonded to said physical support.

2. A process as in claim 1 wherein said liquid suspension is deposited on said physical support in a manner producing streamline flow of said suspension on said physical support.

3. A process as in claim 1 wherein said liquid suspension is deposited on said physical support with a doctor blade having spaced apart openings at the edge contacting said suspension.

4. A process as in claim 3 wherein said doctor blade is vibrated in a direction transverse to the longitudinal axis of said deposited liquid suspension.

5. A process for the preparation of an x-ray image converter exhibiting improved brightness using rare earth oxyhalide phosphor crystals having a plate-like shape comprising the steps of:

(a) forming a liquid suspension containing said phosphor crystals and a binder, said phosphor crystals having the structural formula:

$$LnOX:T_x$$

wherein
Ln is one or more of La and Gd,
X is one or more of Cl and Br, and
$T_x$ is an activator ion selected from Tb and Tm, including mixtures thereof, (b) depositing a layer of said liquid suspension on a physical support with a first velocity gradient in the flow direction corresponding to the longitudinal axis of said phosphor layer and a second velocity gradient in the flow direction generally perpendicular to said longitudinal axis, (c) removing liquid from said deposited liquid suspension to form a solid phosphor coating adhesively bonded to said physical support, and (d) depositing a reflector layer upon said phosphor coating, said reflector layer comprising smaller particle size crystals of an inorganic crystalline solid exhibiting high reflectance in the 300–400 nanometer spectral region.

6. A process as in claim 5 wherein said reflector crystals have a particle size between about 0.2 micron up to about 0.8 micron.

7. A process as in claim 5 wherein said reflector crystals have a refractive index of at least 2.0.

* * * * *